United States Patent [19]

Amari et al.

[11] Patent Number: 4,584,613
[45] Date of Patent: Apr. 22, 1986

[54] APPARATUS FOR RECORDING VIDEO SIGNALS AT A PLURALITY OF DIFFERENT RECORDING SPEEDS

[75] Inventors: Shinji Amari, Yokohama; Tomihiro Nakagawa, Tokyo, both of Japan

[73] Assignee: Sony Corporation, Tokyo, Japan

[21] Appl. No.: 574,210

[22] Filed: Jan. 27, 1984

Related U.S. Application Data

[63] Continuation of Ser. No. 294,139, Aug. 19, 1981, abandoned.

[30] Foreign Application Priority Data

Aug. 20, 1980 [JP] Japan .................................. 55-115018

[51] Int. Cl.$^4$ ......................... H04N 9/491; H04N 5/78
[52] U.S. Cl. .................................. 358/310; 358/906; 358/312; 360/10.3
[58] Field of Search .................... 358/41, 44, 213, 312, 358/315, 330, 906; 360/8, 9.1, 10.1, 10.3, 73, 22, 83, 85, 33.1

[56] References Cited

U.S. PATENT DOCUMENTS

| | | | |
|---|---|---|---|
| 3,542,946 | 11/1970 | Warren | 358/330 |
| 3,588,334 | 6/1971 | Camras | 360/10.3 |
| 4,008,483 | 2/1977 | Gilsdorf | 360/84 X |
| 4,085,418 | 4/1978 | Uno | 358/44 |
| 4,232,329 | 11/1980 | Horak et al. | 360/22 X |
| 4,280,151 | 7/1981 | Tsunekawa et al. | 360/33.1 X |
| 4,282,547 | 8/1981 | Monshita | 358/44 |
| 4,338,631 | 7/1982 | Ota | 360/75 X |
| 4,339,775 | 7/1982 | Lemke et al. | 358/213 |

FOREIGN PATENT DOCUMENTS

| | | | |
|---|---|---|---|
| 2916387 | 10/1979 | Fed. Rep. of Germany | 358/906 |
| 0140507 | 10/1979 | Japan | 358/906 |

OTHER PUBLICATIONS

"Video Tape Recorders" Kybett © 1974 Sams & Co., chapter 8.
"A 22-lb ¼ in. Portable Color Video Camera/Recorder System", Rody, JSMPTE, vol 84, No. 8, pp. 607-609 Aug. 1975.

Primary Examiner—Aristotelis M. Psitos
Attorney, Agent, or Firm—Lewis H. Eslinger; Alvin Sinderbrand

[57] ABSTRACT

A video signal recording apparatus for recording a video signal on a magnetic tape includes an oscillator which generates an oscillation signal; a variable frequency divider for frequency dividing the oscillation signal; a control circuit for controlling the frequency-dividing ratio of the variable frequency divider in accordance with the speed of advancement of the magnetic tape during the recording operation; a frequency divider for generating a plurality of synchronizing signals in response to the output of the variable frequency divider; a camera including an image transducer from which the video signal is obtained in correspondence to incident light from an object image projected on the image transducer, and a transmission device for transmitting the signal from the image transducer at a rate determined by the synchronizing signals; and a recording section including a processing circuit for separately processing the luminance and chrominance components of the transmitted video signal, and at least one transducer for recording the processed video signal on the magnetic tape in response to the synchronizing signals, wherein the video signal is always recorded on the magnetic tape in the same format regardless of the speed of advancement of the magnetic tape during the recording operation.

14 Claims, 4 Drawing Figures

APPARATUS FOR RECORDING VIDEO SIGNALS AT A PLURALITY OF DIFFERENT RECORDING SPEEDS

This is a continuation of application Ser. No. 06/294,139, filed Aug. 19, 1981, now abandoned.

BACKGROUND OF INVENTION

1. Field of the Invention

This invention relates generally to an information recording system and, more particularly, is directed to apparatus for recording a video signal on a magnetic tape.

2. Description of the Prior Art

In one type of helical-scan VTR, a magnetic tape extends helically about the periphery of a guide drum over an angular range of slightly more than 180 degrees and is adapted to be moved or advanced in the longitudinal direction of the tape while at least a portion of the guide drum is rotated. Two rotary transducers or magnetic heads are mounted on the rotated portion of the guide drum so as to rotate with the latter and thereby repeatedly scan across the tape in a path at an angle to the longitudinal direction of the tape. In this manner, a video signal is recorded on the magnetic tape in successive, parallel skewed tracks, with each track generally having a field interval recorded therein and being formed of successive areas which correspond to respective line intervals of the video signal. In order to avoid interference due to cross-talk during a signal reproduction operation, that is, to avoid interference due to signals which are picked up by a scanning transducer from an adjacent track when a given track is scanned, one practice has been to provide guard bands to separate successive parallel tracks on the tape. Such guard bands essentially are "empty" of information so as to avoid cross-talk pick-up from such adjacent guard bands when a particular track is scanned.

However, the use of guard bands to separate successive tracks is a relatively inefficient usage of the record medium, that is, if the guard bands themselves could be provided with useful information, the overall recording density would be improved. Accordingly, it has been the practice to provide the two rotary magnetic heads with different azimuth angles. Hence, information is recorded in one track at one azimuth angle and information is recorded in the next adjacent track with a different azimuth angle. When the information in a track is reproduced by a rotary magnetic head having the same azimuth angle as that used for recording, the information recorded in the scanned track is reproduced with minimal attenuation, but because of azimuth loss, the cross-talk which is picked-up from the next adjacent track is substantially attenuated. In this manner, high density recording can be achieved in which adjacent parallel tracks on the magnetic tape are arranged in an abutting or partially overlapping relation with respect to each other.

As previously discussed, the magnetic heads are rotated to repeatedly scan across the tape in a path at an angle to the longitudinal direction of the tape. Accordingly, during the recording operation of the VTR, the angle between the scanning path, and hence each record track, and the longitudinal direction of the tape is dependent on the rotational speed of the rotary heads and also the speed at which the magnetic tape is longitudinally advanced. Thus, if the speed and direction of advancement of the magnetic tape are not the same during the reproducing operation as during the recording operation, then the scanning path of the magnetic heads during reproducing will not precisely follow or coincide with the record tracks on the tape during movement of the heads across the tape.

In the case of special reproducing modes, that is, slow-, still- and fast-motion reproduction, the tape speed during reproduction is different from the normal tape speed during recording. For example, during slow-motion reproduction, the magnetic heads rotate at a speed which is the same as that used in the normal reproducing mode, while the magnetic tape is driven at a speed which is slower than that used in the normal reproducing mode. Accordingly, the rotating magnetic heads repeatedly scan the record tracks so as to reproduce a picture having a slower motion than it would have if reproduced in a normal reproducing mode. In like manner, during still-motion reproduction, a single track is repeatedly scanned by the rotating heads to produce a still-motion picture. However, the scanning direction by the magnetic heads is inclined with respect to the record tracks being scanned thereby and this inclination gives rise to a tracking deviation. In such case, one of the rotating heads having a first azimuth angle deviates from the track to be scanned thereby and scans a portion of the next adjacent track which had been recorded by the other rotating head having a different azimuth angle. This results in a noise bar in the reproduced picture.

OBJECTS AND SUMMARY OF THE INVENTION

Accordingly, it is an object of this invention to provide an apparatus for recording a video signal on a record medium that avoids the above-described difficulties encountered with the prior art.

More particularly, it is an object of the present invention to provide an apparatus for recording a video signal on a magnetic tape in which the video signal is recorded on the magnetic tape in a still-, slow-, normal- or fast-motion mode when the tape is longitudinally advanced at its normal recording speed.

It is another object of this invention to provide an apparatus for recording a video signal on a record medium that provides for still-, slow-, normal- and fast-motion reproduction of such signal with the substantial elimination of noise components therein.

It is still another object of this invention to provide an apparatus for recording a video signal on a record medium, as aforesaid, which can be used intergrally with or in conjunction with a video camera.

In accordance with an aspect of this invention, apparatus for recording a video signal on a record medium includes means for generating at least one synchronizing signal; camera means including image transducer means from which the video signal is obtained in correspondence to incident light from an object image projected on the image transducer means, and means for transmitting the video signal from the image transducer means at a rate determined by the at least one synchronizing signal; recording means for recording the transmitted video signal on the record medium in response to the at least one synchronizing signal; and means for varying the frequency of the at least one synchronizing signal in accordance with a desired mode of reproduction.

The above, and other, objects, features and advantages of the present invention will be apparent from the following detailed description of illustrative embodiments of the invention which is to be read in connection with the accompanying drawings.

DETAILED DESCRIPTION OF THE PREFERRED EMBODIMENTS

Figure 1:
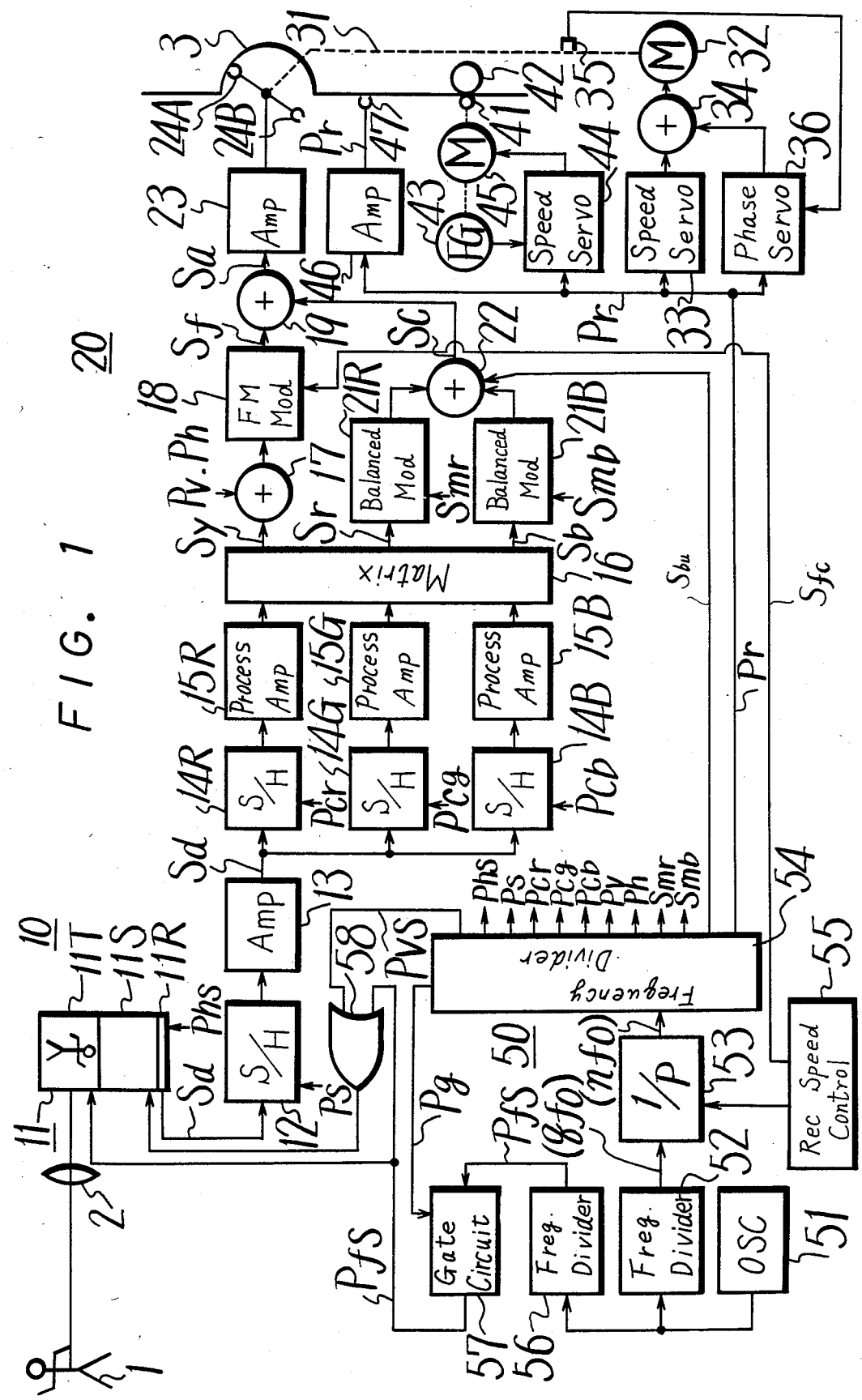
FIG. 1 is a block diagram of a video signal recording apparatus according to one embodiment of this invention.

Referring to the drawings in detail, and initially to FIG. 1 thereof, there is shown a video signal recording apparatus according to one embodiment of this invention. As shown therein, the apparatus is comprised of an electronic camera 10, a recording section 20 and a synchronizing signal generator 50. It is to be noted at this time that, hereinafter, the present invention will be described in regard to an NTSC color video signal to be recorded on a magnetic tape.

The electronic camera 10 includes an optical electronic image transducer 11 which may be a charge transfer device, for example, a bucket-brigade device (BBD) or a charge-coupled device (CCD). In the apparatus of FIG. 1, image transducer 11 employs a charge-coupled device of the frame transfer type which is comprised of a photo-sensitive section 11T, a storage section 11S and an output register 11R. Incident light from an object image 1 is passed through an optical lens 2 onto photo-sensitive section 11T to generate electric charges thereon with the charge pattern electrically duplicating the light image. The electric charge stored in photo-sensitive section 11T is then transferred to storage section 11S and the output from storage section 11S is transferred to output register 11R one horizontal line at a time, as will hereinafter be described in more detail. In addition, red, green and blue color filters (not shown) are sequentially and repeatedly positioned in front of photo-sensitive section 11T for producing corresponding color bits of information on photo-sensitive section 11T.

Synchronizing signal generator 50 supplies at least one synchronizing signal to camera 10 and recording section 20 for synchronizing the operation therebetween and providing a reference recording time. In particular, a master oscillator 51 supplies an oscillation signal to a frequency divider 52 which, in turn, produces a frequency-divided signal having a frequency $q \cdot f_0$ where q is a positive real number and where the frequency $f_0$ is predetermined. The frequency-divided signal from frequency divider 52 is supplied to a variable frequency divider 53 which further frequency-divides the signal in accordance with a frequency dividing ratio 1/p. The frequency dividing ratio 1/p of frequency divider 53 is controlled by a recording speed control circuit 55 which supplies a signal thereto corresponding to the ratio n of the tape speed used during the recording operation and a standard or normal tape speed for recording. For example, n=1 for the standard or normal tape speed used during the recording operation, n<1 for slow-speed recording (which, of course, results in fast-motion reproduction when reproducing at the normal or standard reproducing speed), and n>1 for fast-speed recording (slow-motion reproduction). Accordingly, the output from frequency divider 53 has a frequency $n \cdot f_0$, where n=q/p. It should therefore be appreciated that the output from frequency divider 53 has a frequency which is dependent on the recording tape speed ratio n. Further, the value of p used for the dividing ratio in frequency divider 53 is greater than 1, but has a maximum value much greater than that of q. In this manner, the tape speed ratio n(=q/p) ranges in value from 0 to q. The output from frequency divider 53 is supplied to still another frequency divider 54 which produces various synchronizing signals, as will hereinafter be described in more detail. It should be noted that the various signals produced by frequency divider 54 are used to synchronously control the operation of camera 10 and recording section 20 in response to the tape speed ratio n.

The oscillation signal from oscillator 51 is also supplied to a frequency divider 56 which, in response thereto, produces frame shift pulses $Pf_S$ having a frequency which is much greater than the line frequency of the output signal from image transducer 11. Synchronizing signal generator 50 further includes a gate circuit 57 which transmits the pulses $Pf_S$ from frequency divider 56 to image transducer 11 in response to a control pulse signal $P_g$ from frequency divider 54. Pulse signal $P_g$ has a frequency $n \cdot f_v$, where $f_v$ is the field frequency of the NTSC system, that is, $f_v \cong 59.94$ Hz. Pulse signal $P_g$ is produced during each vertical blanking period of the video signal and accordingly, gate circuit 57 transmits the pulses $Pf_S$ therethrough at such time, the number of pulses $Pf_S$ which are transmitted corresponding to the number of horizontal line intervals occurring during each vertical blanking period. Accordingly, pulses $Pf_S$ are supplied from gate circuit 57 to photo-sensitive section 11T of image transducer 11 during each vertical blanking period to transfer the electric charges produced on photo-sensitive section 11T to storage section 11S, which charges correspond to incident light from an object image 1 projected on photo-sensitive section 11T.

Frequency divider 54 also produces vertical shift pulses $Pv_S$ having a frequency $n \cdot f_h$, where $f_h$ is the horizontal line frequency in the NTSC system, that is, $f_h \cong 15.734$ KHz. Vertical shift pulses $Pv_S$ are supplied to an OR gate 58 during each vertical scanning period and frame shift pulses $Pf_S$ are supplied to OR gate 58 during each vertical blanking period. Accordingly, the output from OR gate 58 is supplied to storage section 11S of image transducer 11, whereby the video information stored in storage section 11S is transferred to output register 11R sequentially line by line during each vertical scanning period. Frequency divider 54 also produces horizontal shift pulses $Ph_S$ during each horizontal scanning period and having a frequency $n \cdot f_S$, where $f_S$ is a predetermined frequency corresponding to the nunber of bits of information in each horizontal line of video information in output register 11R. Accordingly, each horizontal line of video information which is transferred from storage section 11S to output register 11R is then read or transmitted from the latter sequentially bit by bit in response to the horizontal shift pulses Ph$_S$. In this manner, a dot-sequential color video signal S$_d$ is read out from output register 11R. It should be appreciated that the field frequency and horizontal line frequency of the dot-sequential color video signal S$_d$ are n·f$_v$ and n·f$_h$, respectively, in correspondence with the frequency of control pulse signal P$_g$ and vertical shift pulses Pv$_S$.

It should be appreciated that the field frequency of signal S$_d$ is decreased for reductions in the recording tape speed. In such case, the period within which charges are generated in photo-sensitive section 11T becomes relatively long so as to increase the pick-up sensitivity of the camera. In other words, such period corresponds to a slow shutter speed for an ordinary optical camera. To avoid excess charge from being produced on photo-sensitive section 11T, the potential distribution on photo-sensitive section 11T can be controlled so that no charge is generated during a portion of such period.

The color video signal S$_d$ read out from output register 11R is supplied to a sample and hold circuit 12 of recording section 20. Sample and hold circuit 12 samples and holds the signal supplied thereto in accordance with sampling pulses P$_S$ having a frequency n·f$_S$ from frequency divider 54. In other words, sampling pulses P$_S$ have a frequency equivalent to that of horizontal shift pulses Ph$_S$ which are used to control the reading out of information from output register 11R. The sampled and held signal S$_d$ from sample and hold circuit 12 is supplied through an amplifier 13 to sample and hold circuits 14R, 14G and 14B. These latter circuits are supplied with sampling pulses P$_{cr}$, P$_{cg}$ and P$_{cb}$, respectively, from frequency divider 54, each having a frequency of ($\frac{1}{3}$)·n·f$_S$ and differing in phase from each other by 120°. In this manner, sample and hold circuits 14R, 14G and 14B produce red, green and blue color video signals, respectively.

The red, green and blue color video signals are then supplied to process amplifiers 15R, 15G and 15B, respectively, in which a γ-correction operation is performed. The γ-corrected red, green and blue color video signals are then supplied to a matrix circuit 16 which derives therefrom a luminance signal S$_y$ and red and blue color difference signals S$_r$ and S$_b$ at respective outputs therefrom. The luminance signal S$_y$ is supplied to an adder 17 where it is combined with vertical synchronizing signals P$_v$ having a frequency n·f$_v$ and horizontal synchronizing signals P$_h$ having a frequency n·f$_h$, both of the latter signals being generated by frequency divider 54. Of course, it is to be appreciated that the pulse widths of the vertical and horizontal synchronizing signals P$_v$ and P$_h$ are each selected to be equal to 1/n times the pulse widths of the corresponding standard synchronizing signals in the NTSC system. The output from adder 17 is then frequency modulated in a frequency modulator 18 and the frequency modulated (FM) signal S$_f$ therefrom is supplied to an adder 19. A control signal Sf$_c$ from recording speed control circuit 55 is supplied to frequency modulator 18 to adjust the carrier or center frequency of FM signal S$_f$ to a frequency n·f$_c$, where f$_c$ is a predetermined frequency. It should be appreciated that the center or carrier frequency n·f$_c$ is varied in response to the tape speed ratio n and in conformance with the synchronizing signals generated throughout the apparatus of this invention. In addition, the displacement frequency or modulation index of the FM signal S$_f$ has a value n·Δf which is also varied as a function of the tape speed ratio n.

The red and blue color difference signals S$_r$ and S$_b$ from matrix circuit 16 are supplied as modulation input signals to balanced modulator circuits 21R and 21B, respectively. These latter circuits are supplied with red and blue color sub-carrier signals S$_{mr}$ and S$_{mb}$ from frequency divider 54, each of which has a frequency of n(k−$\frac{1}{4}$)f$_h$, where k is a positive integer and may, for example, be equal to 44, and the color sub-carrier signals S$_{mr}$ and S$_{mb}$ differ in phase from each other by 90°. The modulated output from modulator circuits 21R and 21B are then supplied to an adder 22 where they are combined to produce a carrier color signal S$_c$ which is a quadrature two-phase balanced modulation signal. The carrier frequency of signal S$_c$ is n(k−$\frac{1}{4}$)f$_h$. In addition, adder 22 is supplied with a burst signal S$_{bu}$ from frequency divider 54 during each horizontal blanking period, that is, before the start of each horizontal scanning period, to be added to carrier color signal S$_c$. Burst signal S$_{bu}$ has a frequency n(k−$\frac{1}{4}$)f$_h$ and the duration or pulse width of burst signal S$_{bu}$ is selected as 1/n times that of the standard burst signal in the NTSC system.

The output from adder 22 is then combined with FM signal S$_f$ in adder 19 to produce a record video signal S$_a$ comprised of the FM signal S$_f$ distributed in the higher frequency region thereof and the carrier color signal S$_c$ distributed in the lower frequency region thereof. The record video signal S$_a$ is supplied through a record amplifier 23 to rotary magnetic heads 24A and 24B having different azimuth angles and which are separated by an angular distance of approximately 180° and are rotated by a rotating shaft 31 and motor 32 in synchronism with record video signal S$_a$.

Frequency divider 54 also generates a reference pulse signal P$_r$ having a frame frequency of ($\frac{1}{2}$)·n·f$_v$ which is equal to one-half the frequency of the vertical synchronizing signal P$_v$. Pulse signal P$_r$ is supplied to a speed servo circuit 33 which, in turn, supplies a corresponding signal through an adder 34 to motor 32, the latter of which controls the rotation of heads 24A and 24B through rotating shaft 31. Accordingly, each head 24A and 24B is rotated at the frame frequency ($\frac{1}{2}$)·n·f$_v$ by utilizing reference pulse signal P$_r$ as a reference signal.

A pulse generating device 35 is associated with rotating shaft 31 and generates pulses corresponding to the rotary phase of heads 24A and 24B. These pulses are supplied to a phase servo circuit 36 along with reference pulse signal P$_r$ from frequency divider 54. Phase servo circuit 36 compares the signals supplied thereto and supplies a phase correcting signal to adder 34 where it is combined with the speed servo signal from speed servo circuit 33 and then supplied to motor 32 to snychronize the rotating phase of magnetic heads 24A and 24B with the phase of reference pulse signal P$_r$. In this manner, magnetic heads 24A and 24B are rotated in correspondence with the record video signal S$_a$ supplied thereto.

Figure 3:
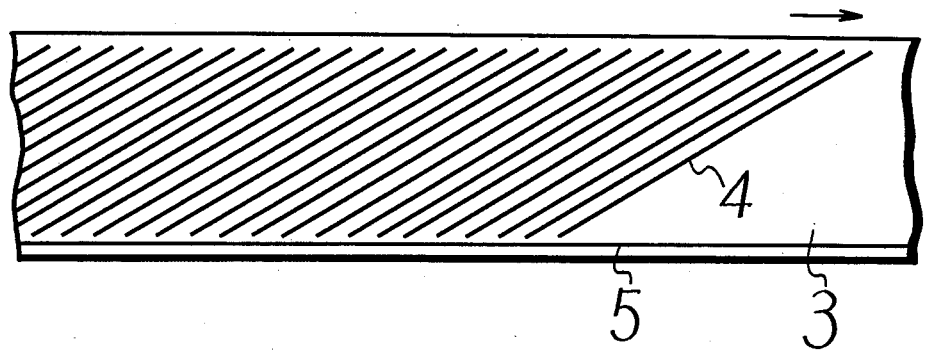
FIG. 3 is a schematic diagram illustrating the arrangement of the record tracks and a control track recorded on a magnetic tape with the apparatus of FIG. 1.

In addition, a magnetic tape 3 is helically wrapped about the periphery of a guide drum assembly (not shown) to which the rotary magnetic heads 24A and 24B are attached over an arc of slightly more than 180°. The tape is longitudinally advanced or transported about the guide drum assembly by means of a capstan 41 and pinch roller 42. Accordingly, during the recording operation, the tape is advanced longitudinally at a predetermined speed so that video or other information signals are recorded by magnetic heads 24A and 24B in a series of parallel tracks 4 (FIG. 3) at a predetermined slant angle to the longitudinal direction of the tape. For controlling the speed of advancement of tape 3, a frequency generator 43 is provided which supplies an output signal to a speed servo circuit 44 for phase-comparison with reference pulse signal $P_r$ which is also supplied to speed servo circuit 44. The phase-compared output from speed servo circuit 44 is then supplied to a capstan motor 45 to set the speed of advancement of tape 3 to a value equal to $n \cdot V_o$, where $V_o$ is a predetermined speed. In addition, reference pulse signal $P_r$ is supplied through a record amplifier 46 to a fixed magnetic head 47 to be recorded as a control signal on a control track 5 (FIG. 3) formed along the lower edge of tape 3.

It should be appreciated that, in the apparatus of FIG. 1 according to this invention, the recording operation is performed so that the rate at which the signal is read-out from output register 11R of image transducer 11, the carrier frequency $n \cdot f_c$ of FM signal $S_f$, the rotating frequency $(\frac{1}{2}) \cdot n \cdot f_v$ of magnetic heads 24A and 24B, and the speed of advancement $n \cdot V_o$ of magnetic tape 3 are varied to be n times that of the rate, the carrier frequency, the rotating frequency and the speed of advancement for a standard or normal NTSC operation. This means that, regardless of the tape speed ratio n, the format in which the video signals are recorded on magnetic tape 3 is the same as that for the standard or normal speed when n equals 1. In other words, the record video signal $S_a$ is recorded in successive parallel tracks 4 on magnetic tape 3 always at the same skew angle, regardless of the tape speed ratio n, and one field of the record video signal $S_a$ is always recorded in each track 4. In particular, since the rotating frequency of magnetic heads 24A and 24B is $(\frac{1}{2}) \cdot n \cdot f_v$ and the speed of advancement of magnetic tape 3 is $n \cdot V_o$, both being varied as a function of the tape speed ratio n, the relative traversing speed of magnetic heads 24A and 24B in respect to the lengthwise and widthwise directions on magnetic tape 3 is constant. This means that, regardless of the tape speed ratio n, the pitch and skew angle of record tracks 4 on magnetic tape 3 are constant. Further, since the field frequency of color video signal $S_d$ read out from image transducer 11 is equal to $n \cdot f_v$, the field frequency of record video signal $S_a$ which is supplied to magnetic heads 24A and 24B is also equal to $n \cdot f_v$. This means that one field of video information is always recorded in each track 4, regardless of the tape speed ratio n.

In addition, since the horizontal line frequency of record video signal $S_a$ is $n \cdot f_h$, the carrier frequency and modulation index FM signal $S_f$ are $n \cdot f_c$ and $n \cdot \Delta f$, respectively, and the carrier frequency of the combination of the carrier color video signal $S_c$ and the burst signal $S_{bu}$ is $n(k-\frac{1}{4})f_h$, the wavelength of the video signal recorded in record tracks 4 is constant, regardless of tape speed ratio n. In like manner, since the frequency of reference pulse signal $P_r$ recorded along the lower edge of magnetic tape 3 on control track 5 is $(\frac{1}{2}) \cdot n \cdot f_v$, the wavelength of pulse signal $P_r$ recorded on control track 5 is constant, regardless of the tape speed ratio n. It should therefore be appreciated that, regardless of the tape speed during the recording operation, the color video signal is always recorded on magnetic tape 3 in the same format. Thus, regardless of the tape speed used during the recording operation, during the reproduction operation when the tape is caused to travel at the normal reproducing speed, the reproducing magnetic heads do not inadvertently scan a portion of a track adjacent to the track then being scanned so as to eliminate the possibility of a noise bar being produced during the reproduction operation. It should further be appreciated that the tape speed ratio n can easily be adjusted by means of the recording speed control circuit 55 which adjusts the value of p used in the frequency dividing ratio 1/p of frequency divider 53.

Further, with the above arrangement, a high density recording operation can be performed. To further eliminate cross-talk interference, the carrier frequency $n \cdot f_c$ of the FM signal $S_f$ from frequency modulator 18 is adjusted so as to differ by $(\frac{1}{2})f_h$ between odd and even field periods. In this manner, the signal $S_f$ is recorded in record tracks 4 in an interleaving manner. Also, the phase of the color sub-carrier signals $S_{mr}$ and $S_{mb}$ and the phase of burst signal $S_{bu}$ are changed 180°, for example, at each horizontal line period in odd field periods. Accordingly, the signal $S_c$ is recorded in an interleaving manner in alternate record tracks 4. With this arrangement, cross-talk interference from adjacent tracks can easily be eliminated during reproduction by means of a comb filter. This enables a high density recording operation in which the record tracks can be arranged in an abutting or partially overlapping relation.

Figure 2:
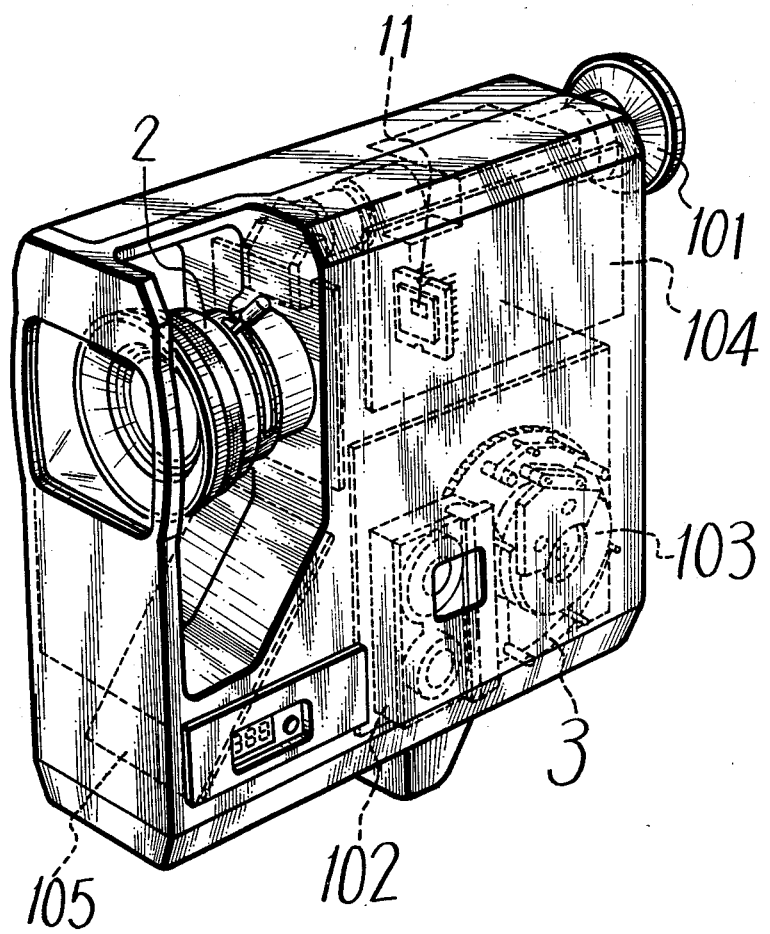
FIG. 2 is a perspective, partially phantom view of a video camera employing the video signal recording apparatus of FIG. 1.

In addition, with conventional video recording apparatus, a video camera is used to produce an NTSC color video signal which includes a luminance component and a chrominance component. These latter components are then supplied through a cable to a separate video tape recording apparatus (VTR), in which the luminance component of the color video signal is frequency modulated and the carrier of the chrominance component of the color video signal is frequency converted to a lower frequency band. The luminance and chrominance components are then recorded on a magnetic tape. It should be appreciated, therefore, that such conventional video recording apparatus is generally complicated in construction, is dimensionally large and is typically relatively heavy. The present invention, on the other hand, in utilizing the apparatus of FIG. 1, provides for an integral assembly comprised of a video camera and an associated recording apparatus. Accordingly, the entire video recording system is greatly simplified, and is compact and lightweight. In particular, an integral video camera including the recording apparatus of FIG. 1 is shown in a partially phantom view in FIG. 2. As shown therein, image transducer 11 is positioned behind optical lens 2 onto which incident light from an object image is projected. The incident light from the object image can also be viewed through a view finder 101 at the rear end of the camera. A cassette 102 containing magnetic tape 3 is loaded into the camera and the magnetic tape 3 is drawn out of cassette 102 and wrapped about the periphery of a guide drum assembly 103 to which the above-described magnetic heads 24A and 24B are rotatably secured. The circuitry of FIG. 1 is readily provided on printed circuit boards 104 and 105 in the camera.

Figure 4:
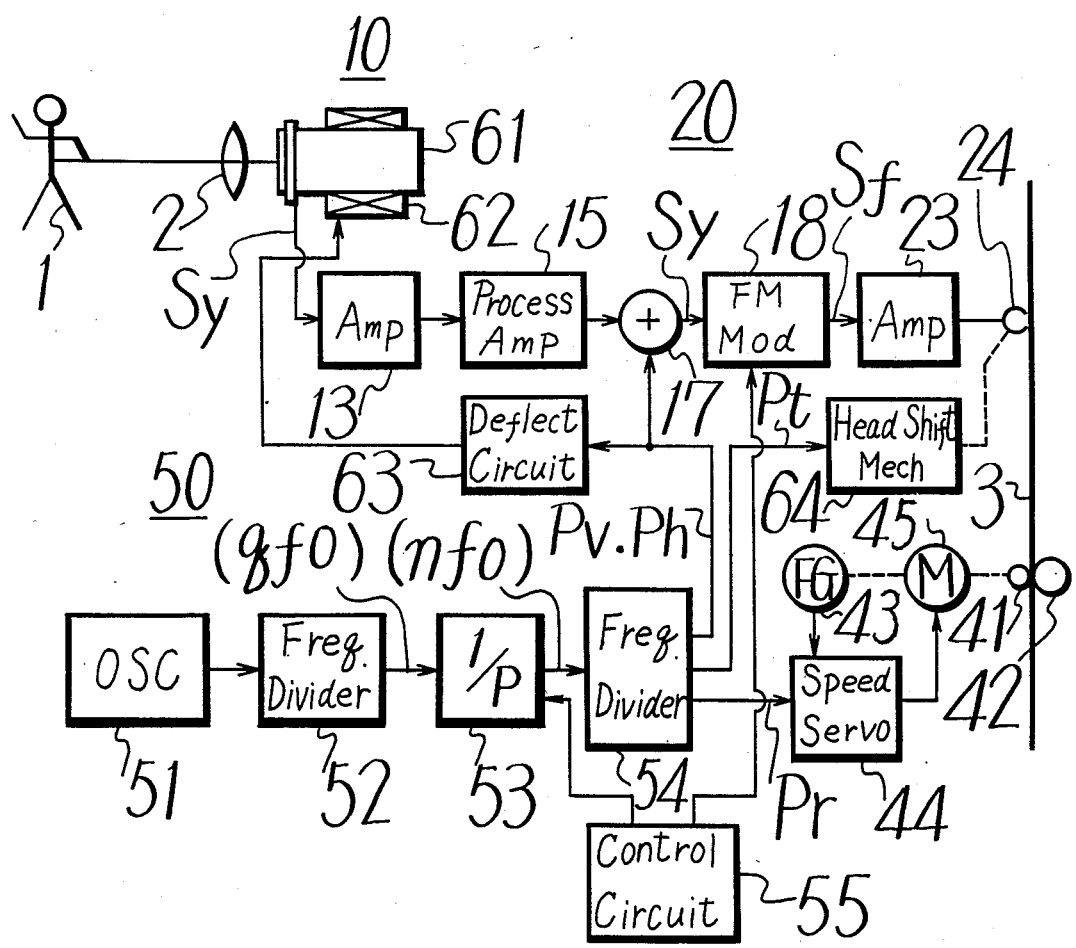
FIG. 4 is a block diagram of a video signal recording apparatus according to another embodiment of this invention.

Referring now to FIG. 4, there is shown a recording apparatus according to another embodiment of this invention, in which elements corresponding to those described above with reference to the apparatus of FIG. 1 are identified by the same reference numerals and a description thereof will not be repeated herein. In the apparatus of FIG. 4, an image pick-up tube 61 is used as the camera device 10. In particular, the image pick-up tube is preferably of the photo conduction-type and includes a cathode electrode which emits an electron beam which is directed towards a target electrode having a photo-conversion layer deposited thereon. The electron beam from the cathode electrode is regulated by a first beam control or beam-forming electrode which sharpens the electron beam, while a second accelerating electrode further sharpens the electron beam and accelerates the beam towards the target electrode. The electron beam from the cathode electrode is controlled by deflection coils 62 to scan the target electrode and, depending on the amount of incident light from an object image 1 projected on the target electrode through lens 2, a color video output signal is produced. However, for the sake of brevity, processing of only the luminance component $S_y$ of the color video signal is shown.

As in the apparatus of FIG. 1, the recording apparatus of FIG. 4 includes a master oscillator 51, frequency dividers 52, 53 and 54 and a recording speed control circuit 55, all arranged and functioning in a substantially identical manner to the same-numbered elements in the apparatus of FIG. 1, as previously discussed. The recording section 20 of the apparatus of FIG. 4 includes a deflection control circuit 63 supplied with the vertical and horizontal synchronizing signals $P_v$ and $P_h$ having frequencies of $n \cdot f_v$ and $n \cdot f_h$, respectively, for supplying vertical and horizontal deflection signals to deflection coils 62 to control the scanning of the electron beam in image pick-up tube 61. Accordingly, since the scanning by the electron beam is controlled as a function of the tape speed ratio n, the luminance component $S_y$ of the color video signal produced by image pick-up tube 61 has a field frequency of $n \cdot f_v$ and a horizontal line frequency $n \cdot f_h$.

The luminance component $S_y$ from image pick-up tube 61 is supplied through a pre-amplifier 13 to a process amplifier 15 in which a $\gamma$-correction operation is performed. The output from process amplifier 15 is combined with the vertical and horizontal synchronizing signals $P_v$ and $P_h$ in an adder 17, the output of which is frequency modulated in frequency modulator 18 to produce an FM signal $S_f$ having a carrier frequency $n \cdot f_c$ and a displacement frequency or modulation index $n \cdot \Delta f$. FM signal $S_f$ is then supplied through a record amplifier 23 and recorded on magnetic tape 3 by a fixed magnetic head 24.

The speed of advancement of magnetic tape 3 is controlled to be $n \cdot V_o$ by capstan 41, pinch roller 42, frequency generator 43, speed servo circuit 44 and drive motor 45, in the same manner as previously described in the apparatus of FIG. 1. In particular, a pulse $P_r$ from frequency divider 54 is supplied to speed servo circuit 44 for each period $\tau/n$, in which $\tau$ is a given period determined by the length of magnetic tape 3 upon the completion of the recording operation along each track of magnetic tape 3. In addition, a head shift mechanism 64 is supplied with a head shift pulse $P_t$ from frequency divider 54 for adjusting the height of magnetic head 24 by an amount corresponding to the track width and the desired guard band width, during each change in the direction of advancement of magnetic tape 3. In this manner, a plurality of longitudinal tracks are recorded on magnetic tape 3. It should be appreciated that the height adjustment of magnetic head 24, the speed of advancement of magnetic tape 3 and the field and horizontal line frequencies of the video signal from image pick-up space tube 61 are all varied in accordance with the tape speed ratio n. Accordingly, still-, slow-, normal- and fast-motion recording can easily be performed.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for recording a video signal in a plurality of tracks extending obliquely on a longitudinally advanced magnetic tape, said video signal occurring in successive predetermined intervals, said tracks being at a uniform predetermined angle with respect to the longitudinal direction of the tape and having a uniform predetermined pitch and each including one said predetermined interval for representing a standard track format, said apparatus comprising:
   means for generating at least one synchronizing signal of variable frequency;
   means for determining said variable frequency in accordance with a desired mode of reproduction;
   camera means including image transducer means from which said video signal is obtained in correspondence to incident light from an object image projected on said image transducer means, and means for transmitting said video signal from said image transducer at a selected rate;
   recording means including recording head means repeatedly scanning across said tape for recording said transmitted signal thereon;
   tape drive means for advancing said tape in said longitudinal direction while said head means scans thereacross; and
   means for controlling said selected rate and the speeds at which said head means scans across the tape and at which the tape is longitudinally advanced, respectively, in dependence on said variable frequency of the synchronizing signal so that the tracks are always disposed on said tape regardless of the speed of advancement of the tape.

2. Apparatus according to claim 1; in which said means for generating includes oscillator means for producing a reference oscillation signal, and variable frequency divider means for frequency dividing said oscillation signal to produce a frequency-divided oscillation signal; and in which said means for determining said variable frequency includes control means for controlling the frequency dividing ratio of said variable frequency divider means in accordance with said desired mode of reproduction.

3. Apparatus according to claim 2; in which said means for generating includes frequency divider means for generating said at least one synchronizing signal in response to said frequency-divided oscillation signal.

4. Apparatus according to claim 2; in which said means for controlling controls the frequency dividing ratio of said variable frequency divider means in accordance with the speed of advancement of said tape during recording.

5. Apparatus according to claim 1; in which said image transducer means includes photo-sensitive means for recording a charge pattern corresponding to incident light from an object image projected thereon.

6. Apparatus according to claim 5; in which said video signal is separated into a plurality of field intervals and each field interval is separated into a plurality of horizontal line intervals, and in which said means for transmitting includes storage means for sequentially storing each of said field intervals of said video signal in accordance with a respective charge pattern recorded on said photo-sensitive means at a rate determined by said at least one synchronizing signal, and register means for sequentially transmitting each line of said stored field intervals of said video signal at a rate determined by said at least one synchronizing signal.

7. Apparatus according to claim 5; in which said means for transmitting includes electron gun means for scanning said photo-sensitive means at a rate determined by said at least one synchronizing signal.

8. Apparatus according to claim 1; in which said recording means includes processing means for processing said transmitted signal prior to recording said transmitted signal on said tape.

9. Apparatus according to claim 8; in which said processing means includes color signal generating means for generating primary color video signals from said transmitted video signal, matrix means for generating a luminance signal and color difference signals from said primary color video signals, and first adding means for combining said luminance signal and said color difference signals to form said processed video signal.

10. Apparatus according to claim 9; in which said processing means further includes angular modulation means for angularly modulating a first carrier signal with said luminance signal, balanced modulator means for modulating a second carrier signal with said color difference signals, and in which said first adding means combines the angularly modulated luminance signal with the modulated color difference signals to form said processed video signal.

11. Apparatus according to claim 10; in which said means for generating produces horizontal and vertical synchronizing signals and a burst signal, and said processing means further includes second adder means for adding said horizontal and vertical synchronizing signals to said luminance signal and third adder means for combining said color difference signals and said burst signal.

12. Apparatus according to claim 1; in which said means for generating produces a reference pulse signal in accordance with said desired mode of reproduction, and said means for controlling includes first servo means for controlling the speed of advancement of said magnetic tape by said tape drive means in accordance with the frequency of said reference pulse signal.

13. Apparatus according to claim 12; in which said means for controlling includes second servo means for controlling the speed of advancement of said magnetic tape in accordance with the phase of said reference pulse signal.

14. Apparatus according to claim 13; in which said recording head means includes at least one rotary magnetic head and said means for controlling includes third servo means for controlling the speed of rotation of said at least one rotary magnetic head in accordance with said reference pulse signal.

* * * * *